Sept. 1, 1959          H. HIGER          2,902,227

MACHINE FOR CUTTING OR DISINTEGRATING MATTER

Filed Feb. 7, 1955          2 Sheets-Sheet 1

INVENTOR.
HARRY HIGER
BY Gregory S. Dolgoruhoff
ATTORNEY.

INVENTOR.
HARRY HIGER
BY Gregory J. Dolgorukov
ATTORNEY.

United States Patent Office 2,902,227
Patented Sept. 1, 1959

2,902,227

MACHINE FOR CUTTING OR DISINTEGRATING MATTER

Harry Higer, Detroit, Mich.

Application February 7, 1955, Serial No. 486,369

8 Claims. (Cl. 241—257)

This invention relates to machines for cutting or disintegrating matters for disposal purposes or for carrying out steps of various industrial processes. The invention has a particular, but not exclusive reference to a machine for cutting or disintegrating various refuse matters, such as garbage which may contain pieces of matter difficult to cut, such as small pieces of wood, nails, small bones, broken glass, feathers, corn husks, and the like. The present application is a continuation-in-part of my co-pending applications, Serial No. 352,882, filed May 4, 1953 for Disposal Apparatus, now abandoned; and Serial No. 420,286, filed on April 1, 1954 for Disposal Apparatus, now Patent No. 2,846,155; and of an application, Serial No. 486,368, filed on the same date with the present application for Matter Disintegrating or Cutting Apparatus.

The application filed on the same date with the present application and referred to above explains in detail the problem confronted by those skilled in the art in disintegrating or cutting various matters, particularly refuse matter such as garbage. Said application also explains the difficulties which have been confronted by those skilled in the art in constructing machines or apparatus for cutting or disintegrating matter for the purpose of disposal or as a part of various industrial processes. Said application also disclosed a number of machines for cutting or disintegrating matter embodying the invention claimed in said application.

In constructing machines based on the inventive concept disclosed in the application above referred to there arose a number of problems and difficulties interfering with proper operation of such machines. Some of such difficulties could not be diagnosed or readily explained and required exceedingly strenuous experimentation which showed various unexpected results. For instance, certain expedients presenting logical design solutions for such problems proved ineffective, while other constructional changes proved exceedingly effective.

One of the serious difficulties confronted in constructions of machines of this general nature and embodying the inventive concept disclosed in the application above referred to was "backing up" of the matter in the recess. Such backing up manifested itself in the converging recess becoming gradually filled with cut matter which because of the admixture of water was in the form of mushy liquid gradually filling the recess. When such a condition developed, there was produced interference with the entry of the matter to be cut into the receiving end of the recess, whereby effectiveness of the machine was greatly decreased. In addition, as the converging recess became more and more filled with the cut matter in liquid or semi-liquid form, driving of the machine became more and more difficult, since the blades had to shear the mass of such liquid and the entire machine began operating as a "water brake," consuming large amount of driving power in shearing the liquid and heating the same.

I have found that much of the above difficulty resulted from the fact that while relatively large pieces entering the wide end of the matter-receiving recess filled it only loosely, as soon as such pieces are cut in two and fall further down, they fill that particular portion of the recess more fully, and upon further cutting crowd the lower portion of the recess, with such condition increasing in intensity as cutting in two continues or progresses. In other words, as the matter is cut, the same volume of the recess space is required to house such matter, while because of the inherent nature of the machine less and less volume is presented thereto as the matter passes into the converging end of the recess. Thus, while the total volume of the matter to be cut and of the water flowing through the recess is relatively constant, the cross sectional area of the recess, which for the purpose of the present disclosure may be considered as a conduit, is decreasing.

My application referred to above disclosed making curvature of the recess-forming walls gradually decreasing toward the grading outlet of the machine. In addition, said application also disclosed making the recess outwardly converging and, therefore, increasing the length of the annular area of the cross sections of the recess toward the discharge end thereof in the effort to maintain its cross sectional area as closely equal or approximating that of the receiving end of the recess, as practical. I have found such expedients exceedingly useful and effective in many practical situations.

However, I have also found that under certain conditions, primarily due to space limitations, it is desired to construct a machine of exceedingly compact nature, which considerations are particularly important in machines of smaller size, such as may be used in homes. Under such conditions other means than those disclosed in my said application may be necessary to eliminate the above difficulties.

One of the objects of the present invention is to provide an improved matter-cutting or disintegrating machine in which the difficulties and disadvantages explained above are overcome and largely eliminated and the tendency of the cut matter to back-up in the matter-receiving recess of the machine is overcome and largely eliminated.

Another object of the present invention is to provide an improved cutting or disintegrating machine of the nature disclosed in my prior and simultaneously filed applications, in which respective capacities of its rough cutting and fine cutting portions are so balanced that the machine does not become clogged with finely cut material, which is to say, that the capacity of fine cutting portion of the machine remains equal or larger than that of the coarse cutting portion of the machine under all operation conditions or speeds of the machine.

A further object of the present invention is to provide a machine of the general nature specified above and embodying the invention disclosed in my said co-pending applications, improved means being provided therein to counteract the tendency of the cut matter to slow down in its axial speed due to the increased frictional resistance of the converging walls of the recess and particularly of the grading opening or annular slot constituting such opening.

A still further object of the present invention is to provide an improved machine of the above nature and having means whereby the cut matter is driven through the grading opening at a greater speed than it would flow therethrough otherwise, creating suction in the machine and preventing accumulation of cut matter in the form of thick or mushy liquid in the delivery or narrow portion of the matter-receiving recess.

A still further object of the present invention is to provide a machine of the nature described in the preceding paragraph, in which the matter is discharged from the grading outlet at considerable axial and peripheral speed.

A still further object of the present invention is to provide a machine of the above nature, means being provided at its discharge end to increase still further the peripheral speed of the cut matter and to discharge such matter into the disposal conduit with the aid of centrifugal force produced by such means.

A still further object of the present invention is to provide a machine of the above general nature, means being provided therein to prevent excessive loading of the machine at its receiving end and thus to decrease or to eliminate backing up of the matter, and yet to avoid decreasing capacity of said receiving end to receive relatively large pieces.

A still further object of the invention is to provide an improved machine of the nature disclosed in my prior and simultaneously filed applications, in which machine there are provided means to keep the matter passing through the machine stirred with some pieces being thrown up (or back toward the receiving end) for cutting at higher portions of the blades than those at which their cutting would otherwise occur, as well as splash some of the water upwardly and around to water-scrub the entire working portion of the machine.

A still further object of the invention is to provide an improved machine of the nature disclosed in my prior and simultaneously filed applications, in which machine there are provided means eliminating packing or jamming of the recess of the machine, in and after stopping, with the matter falling down toward the bottom of the recess and forming therein so solid a mass as to interfere with starting of the machine after stop.

Further objects and advantages of this invention will be apparent from the following description and appended claims, reference being had to the accompanying drawings forming a part of this specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

In accordance with the present invention means are provided to produce an operational balance between the passing capacity of the receiving end of the recess with the capacity of its discharge and thus to prevent backing up of the cut matter toward the receiving end thereof.

In accordance with the invention such means may be provided either at the receiving end of the recess to restrict its receiving capacity or to regulate it in a desirable manner; or at the discharge end of the recess to increase productivity thereof by driving the cut matter in the axial direction. By virtue of such expedients which may be used either separately or in combination excessively long recesses which may otherwise be required are avoided, and the machines are made more compact and reliable. Such means are of particular importance in machines which are centrally loaded, as may be the case with smaller machines suitable for individual homes.

In accordance with the invention means are also provided to dispose of the cut matter in a more reliable manner and to prevent clogging of the conduits leading from the discharge end of the apparatus.

Figure 1:
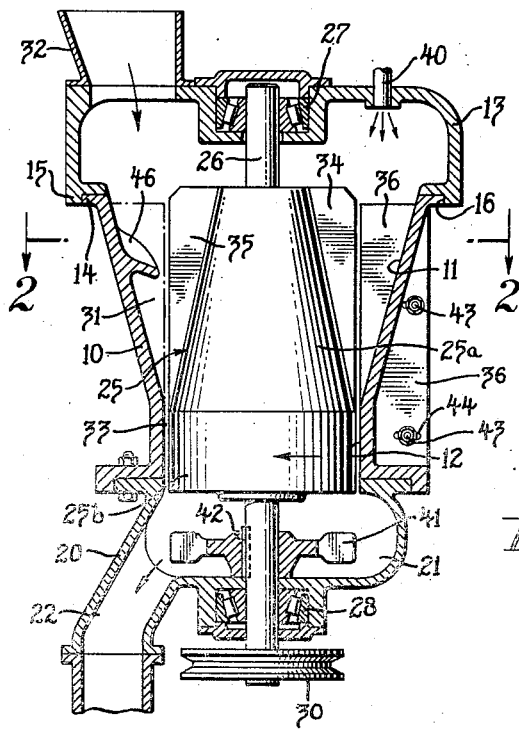
Fig. 1 is a vertical sectional view showing a machine embodying the present invention.
Figure 2:
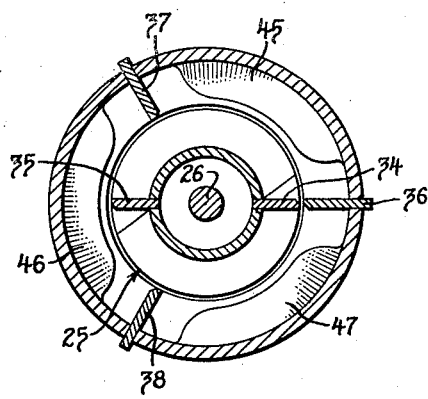
Fig. 2 is a sectional view taken in the direction of the arrows on the section plane passing through the line 2—2 of Fig. 1.
Figure 3:
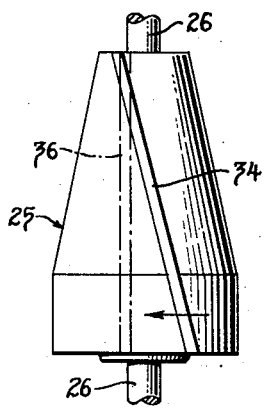
Fig. 3 is a view of the rotor of the construction of Fig. 1, said view being taken to show arrangement of a blade on the rotor in its relationship to the cooperating blade provided on the outer member.

In the drawings there are shown by way of example a number of machines embodying the present invention. Referring specifically to Figs. 1–3, the machine illustrated therein comprises a hollow member 10, the inner surface 11 of which forms a downwardly converging conical recess. The lower portions of the walls of the member 10 are cylindrical as indicated at 12. A cover 13 rests on the upper shoulder 14 of the member 10 and is centered with respect thereto with the aid of centering flange 15 provided on said cover 13 and engaging the circular edges 16 of the shoulder 14 of the member 10. A housing 20 is provided at the lower end of the member 10 and is connected thereto in any suitable manner, such as with the aid of screws or bolts, which housing provides a circular chamber 21 having a discharge conduit 22 leading outwardly and downwardly therefrom. The housing 20 is centered with respect to the member 10 similarly to the cover 13 as can be clearly seen from examination of Fig. 1.

Within the member 10 there is operatively mounted a rotor generally indicated by the numeral 25 and having its upper portion 25a in the form of an upwardly converging cone and its lower portion 25b in the form of a cylinder, said cylinder having diameter smaller than the diameter of the internal cylindrical walls 12 of the member 10, in order to provide a predetermined clearance between the portion 25b of the rotor and the wall 12 of the member 10. The rotor 25 has a shaft 26, the upper end of which is journaled in a roller bearing 27 provided in the center of the cover 13, while the lower end of said shaft 26 is similarly mounted in a bearing 28 provided at the center of the casing 21. A driven pulley 30 is mounted on the lower extremity of the shaft 26, which pulley may be connected through a V-belt (not shown) with a driving pulley of a suitable electric motor.

It will now be seen in view of the foregoing that there is thus formed between the upwardly converging rotor 25 and the upwardly diverging walls of the member 10 a downwardly converging or wedging recess 31 of an annular form having a relatively wide upper end adapted to receive the matter to be cut from a hopper 32, and merging at its lower end with a grading annular passage 33 formed between the cylindrical walls of the member 10 and portion 25b of the rotor 25. The width of the passage 33 is the predetermined clearance between the portion 25b of the rotor and the wall 12 of the member 10. Two blades 34 and 35 are provided on the rotor 25, which blades extend radially therefrom to approximately the middle of the cross section of the recess 31. Three radially extending blades 36, 37, and 38 are provided in the member 10 and extend inwardly of said member for meeting with a predetermined clearance the blades 34 and 35 of the rotor 25. By virtue of such a construction, the matter received in the recess 31 is progressively cut in two, as is described in detail in my application filed on the same day with the present application. A water pipe 40 is provided in the cover 13 to ensure ample but not excessive flow of water through the recess 13.

A wheel 41 is mounted on the shaft 26 under the rotor 35 for the purpose of stirring the cut matter in the chamber 21, and to impart circular motion to such matter for discharging it through the conduit 22. The wheel 41 is keyed to the shaft 26 as indicated at 42. The blades 36, 37 and 38 provided on the member 10 are secured to the ribs provided on said casing, with the aid of screws 43 engaging such blades at slots such as 44. By virtue of such an arrangement adjustment of the knives or blades is permitted. A similar arrangement may also be made for adjustment of blades 34 and 35 of the rotor 25. The blades 34 and 35 provided on the rotor 25 are inclined with respect to the longitudinal axis of the rotor to have their upper ends offset forwardly with respect to rotation of the rotor in order to produce progressive cutting engagement between the blades provided on the outer member 10 and the blades provided on the rotor 25, as explained in my application referred to above.

In accordance with the invention means are provided to prevent backing up of the matter in the machine, which is to say, causing the recess 31 to become filled with cut matter, which is usually in the form of a heavy mushy liquid, thus interfering with entry of the matter to be cut and causing considerable parasitic resistance to rotation of the rotor. In the embodiment of the invention illustrated in Figs. 1–3, such means are exemplified by inclined shelves 45, 46 and 47 provided on the member 10 at the upper or receiving end of the recess 31 between the blades 36, 37 and 38, as is best shown in Figs. 1 and 2. The shelves 45, 46 and 47 are inclined at approximately 45 degrees with respect to the axis of the machine, with their forward ends, with respect to the rotation of the rotor 25, being raised. By virtue of such a construction relatively large pieces of matter entering into the recess 31 from the hopper 32 are prevented from passing into the recess 31 too fast. Such pieces are first supported by the shelves and their passage further into the recess 31 is thus delayed. Moreover, by virtue of the provision of such shelves, the matter in the recess, particularly the matter which is partly cut, is kept stirred, with some of the larger pieces thrown up for cutting at a higher portion of the blades than would occur otherwise, thus equalizing the load on the blades. In addition, packing of the matter into the lower portion of the recess when the machine is stopped, and forming therein a mass so solid as to make starting of the machine difficult, or impossible without first removing some of such matter, is thus prevented. It can also be appreciated that the water flowing through the recess and whirled around therein by the action of the rotor blades is splashed against the inclined shelves 45, 46 and 47 and is thus directed upwardly, washing and scrubbing the entire working portion of the machine. Such an operation makes it possible to wash the machine thoroughly merely by running it idle for a few minutes with the water flowing. By virtue of such a construction, the matter-passing capacity of the upper or receiving end of the recess is somewhat restricted, and passage of the matter therethrough slowed down in a degree determined by the size of the shelves and their inclination, in order to balance the matter-passing capacity of the receiving end of the recess 31 with that of the delivery end 33 and ensuring that no more matter to be cut will be loaded into the recess per unit of time than can be discharged in the same unit of time through the grading outlet 33. It can be easily appreciated that if more matter is loaded into the recess 31 and cut therein per unit of time than can be discharged through the grading opening 33, the recess 31 will gradually become filled with cut matter. Such a condition will not only prevent entry of the new matter into the recess, but the cut matter being in the form of mushy liquid the machine will begin to operate as "water brake" heating such cut matter and wasting considerable amount of power. With high speed machines such backing up of the cut matter may cause burning out of electric motors.

Figure 4:
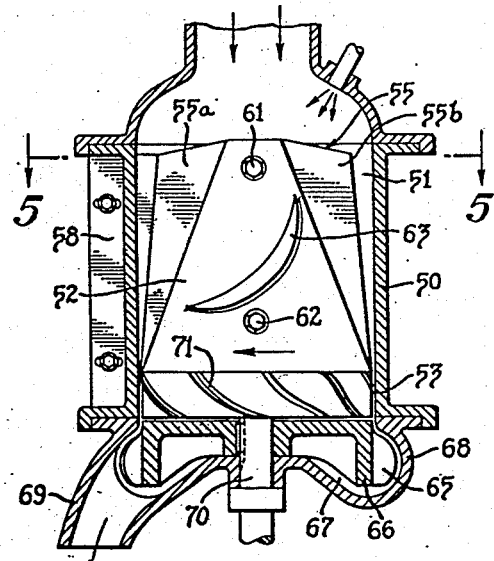
Fig. 4 is a vertical sectional view showing machine of a modified construction.
Figure 5:
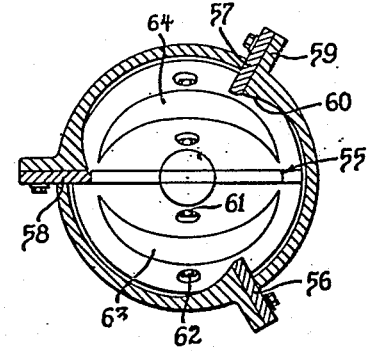
Fig. 5 is a sectional view taken in the direction of the arrows on the section plane passing through the section line 5—5 of Fig. 4.
Figure 6:
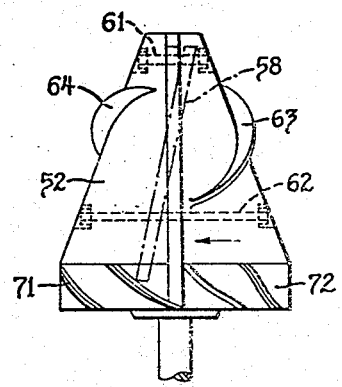
Fig. 6 is a view showing separately the rotor of the machine of Fig. 4.

The construction illustrated in Figs. 4, 5 and 6 is similar in its general organization to the construction of Figs. 1–3. An important feature of difference between these two constructions lies in the fact that while the outer member 10 of the construction of Fig. 1 is conical, the member 50 of the construction of Figs. 4–6 is cylindrical. Nevertheless, as in other constructions embodying the present invention, a downwardly converging recess 51 is formed in this construction between the inner cylindrical walls of the member 50 and the walls of the upwardly converging cone 52. The lower end of the recess merges with the annular grading outlet 53. Instead of separate blades as in Fig. 1, a single diametrical blade member 55 is provided in this construction. Blade member 55 has portions 55a and 55b extending radially from the body of the cone 52 to form radial blades or knives on said cone, adapted to cooperate with the blades 56, 57 and 58 provided on the outer member 50 and secured to the lips 59 provided thereon. Supporting shoulders 60 are provided on the inner walls of the member 50 to provide a stronger support for the blades and to fill the space behind said blades which space is inert and serves merely to accumulate matter therein, making cleaning more difficult.

Bolts 61 and 62 are provided in order to strengthen the rotor 52 and to steady the blade member 55 in place. It will be noted from examination of Fig. 4 that the blade portions 55a and 55b extend radially to a somewhat greater distance than that determined by the bisector of the angle of the cross section of the recess 51. I have found such construction to be advantageous under certain conditions, particularly with high speed machines where pieces to be cut are driven by the rotor blades and are pressed against the walls of the outer member by the operation of centrifugal force. With the high speed machines, the above described arrangement ensures that a piece is cut in two substantially equal parts. It can be appreciated that with a piece to be cut being pressed against the outer wall and not contacting the wall of the cone it may not be cut in two substantially equal parts if the blades meet at the line forming a bisector of the cross sectional angle of the recess.

Vanes 63 and 64 are provided on the rotor 52 and are inclined with respect to the longitudinal axis of the machine or the plane of its rotation in a manner shown in Fig. 4. Function of said vanes 63 and 64 is somewhat similar to that of the shelves 45, 46 and 47 of the machine of Fig. 1. However, while shelves merely reflect or rebound the matter thrown against them by the blades, operation of the rotating vanes 63 and 64 is direct. The vanes 63 and 64 stir the matter, throw some pieces up for further cutting on higher portions of the blades, splash the water, as well as prevent packing of the matter at the lower portions of the recess when the machine is stopped, thus eliminating starting difficulties.

Vanes 65 are provided on the member 66 operating within the chamber 67 provided within the lower casing 68 which is adapted to receive the cut matter. The vanes 65 circulate the matter within the chamber 67 and thus discharge it by the operation of centrifugal force through the conduit 69. In the present embodiment of the invention the member 66 is made as a separate member keyed to the shaft 70 of the rotor. It will be understood, however, that said member may be made integral with the rotor 52.

As shown in Fig. 6, the blade member 55 extends in a plane passing through the axis of the rotor 52. In order to produce a progressive cutting engagement between a pair of blades in cutting contact, it is the blades on the outer member 50 that are inclined with respect to the longitudinal axis of the machine, with the upper end being offset rearwardly with respect to the rotation of the rotor, as is shown in Fig. 6.

In accordance with the invention, there are provided means adapted to drive the cut matter through the grading outlet or conduit 53 in a more positive and strong manner than in the machines so far disclosed and thus to increase the matter-passing capacity of said conduit. In the embodiment of the invention shown in Figs. 4–6, such means are exemplified by vanes 71 provided on the cylindrical portion 72 of the rotor 52. The outward extent of said vanes 71 is substantially equal to the width of the conduit 53 less necessary clearance. The vanes 71 may be curved as indicated in Fig. 4, in order to provide for a gradual increase in axial velocity of the matter driven by said vanes through the conduit 53. By virtue of such a construction, driving of the matter through the conduit 53 may increase the matter-passing capacity of said discharge conduit to a point where said conduit not only fully discharges the cut matter but even creates some suction at the lower end of the recess 51.

Figure 7:
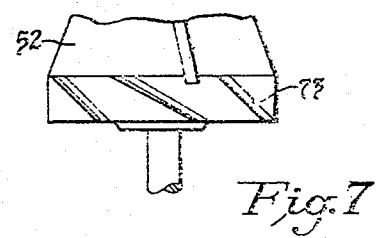
Figs. 7, 8 and 9 show the lower part of the rotors having modified matter-pumping means provided thereon for the purpose of driving such matter through the grading outlet.

Fig. 7 shows the lower part of a rotor similar to rotor 52 of the construction of Figs. 4–6. However, in this construction in order to decrease manufacturing costs, the construction is simplified by providing vanes 73 which are straight rather than curved and are spaced wider than in the construction of Figs. 4–6.

Figure 9:
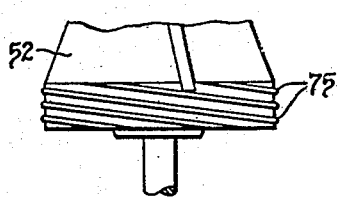

In the construction of Fig. 9 the vanes or ridges 75 have a much greater angle with respect to the longitudinal axis of the rotor 52 than the vane 73 of the construction of Fig. 7. Such a construction is particularly advantageous in the machines having a straight axis discharge wherein creating axial rather than centrifugal flow of the cut matter is desired. In addition to the above functional advantage, making ridges such as 75 is greatly simplified since they may be integral with the rotor 52 and, therefore, may be cut on a lathe in making the rotor, similarly to a screw thread.

Figure 8:
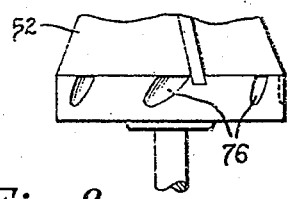

In the construction of Fig. 8, means increasing the flow of the cut matter through the conduit such as 53 are exemplified by recess or pockets 76 provided on the cylindrical portion of the rotor 52. I have noted considerable improvement in the operation of the machine provided with such pockets. It is my present understanding that such improvement is due to the fact that in rotation of the rotor, vacuum or partial vacuum is created in such pocket 76, causing the mushy cut matter to rush into said pockets. However, in acquiring axial velocity in the process of such movement, the matter continues to flow through the rest of the grading outlet by inertia and issues into the chamber receiving the cut matter. However, I do not wish to be bound by my present understanding of operation of such means, as described above.

It will be understood that in my improved machine, the grade of cutting, i.e., fineness or coarseness of the pieces discharged by the machine, depends primarily upon the width of the grading discharge outlet thereof. Therefore, increasing or decreasing the width of such outlet produces coarser or finer cutting. Thus, the grade of cutting in my improved machine may be varied to meet various requirements, such as specifications in industrial processes, or in cases of garbage, city requirements which the cut matter must meet in order to be dischargeable into the city sewer system.

I claim:

1. In a garbage grinding apparatus, a hollow vertically extending stationary casing, a rotor operatively mounted within said casing and having a body comprising a conically shaped upper portion and a cylindrically shaped lower portion coaxial with said upper portion, a smooth cylindrical surface formed on the lower portion of said casing to receive the cylindrical portion of said rotor and to form an annular grading matter-discharging opening therebetween, a plurality of straight blades made as separate pieces and mounted on said rotor, a plurality of straight vertical blades adjustably mounted on said casing and adapted, when the rotor is rotated, to meet in cutting engagement with said rotor blades along lines lying within a cylindrical plane.

2. In a garbage grinding apparatus, a hollow vertically extending stationary casing, a rotor operatively mounted within said casing and having a body comprising a conically shaped upper portion and a cylindrically shaped lower portion coaxial with said upper portion, a smooth cylindrical surface formed on the lower portion of said casing to receive the cylindrical portion of said rotor and to form an annular grading matter-discharging opening therebetween, a plurality of straight blades made as separate pieces and mounted on said rotor, a plurality of straight vertical blades adjustably mounted on said casing and adapted, when the rotor is rotated, to meet in cutting engagement with said rotor blades along lines lying within a cylindrical plane, and a plurality of raised elements provided on the cylindrical portion of said rotor to form pumping vanes and passages therebetween for the cut matter.

3. In a garbage grinding apparatus, a hollow vertically extending stationary casing, a rotor operatively mounted in the lower portion of said casing, said rotor including a body having a conically shaped upper portion and a cylindrically shaped lower portion, with said cylindrical portion of the rotor and said casing forming an annular matter-discharging opening, a plurality of cutting blades secured to the upper portion of said rotor body, a plurality of cutting blades secured to said casing on the inside thereof to cooperate with the blades on said rotor to cut the matter fed into said casing, and a plurality of vanes on said cylindrical portion of the rotor, said vanes being inclined with respect to the axis of the rotor in the direction of rotation of the rotor, and forming between them a corresponding plurality of passages for passing the cut matter therethrough.

4. In a garbage grinding apparatus, a hollow vertically extending stationary casing, a rotor operatively mounted in the lower portion of said casing, said rotor including a body having a conically shaped upper portion and a cylindrically shaped lower portion, with said cylindrical portion of the rotor and said casing forming an annular matter-discharging opening, a plurality of cutting blades secured to the upper portion of said rotor body, a plurality of cutting blades secured to said casing on the inside thereof to cooperate with the blades on said rotor to cut the matter fed into said casing, and a plurality of straight vanes on said cylindrical portion of the rotor, with said vanes having their upper ends advanced in the direction of rotation of the rotor and forming between them a corresponding plurality of passages for passing the cut matter therethrough, with said vanes operating because of their inclined arrangement to produce forces driving the cut matter through said passages.

5. In a garbage grinding apparatus, a hollow vertically extending stationary casing, a rotor operatively mounted in the lower portion of said casing, said rotor including a body having a conically shaped upper portion and a cylindrically shaped lower portion, with said cylindrical portion of the rotor and said casing forming an annular matter-discharging opening, a plurality of cutting blades secured to the upper portion of said rotor body, a plurality of cutting blades secured to said casing on the inside thereof to cooperate with the blades on said rotor to cut the matter fed into said casing, and a plurality of vanes on said cylindrical portion of the rotor to form between them a plurality of matter-discharging passages, with said vanes having their ends closer to the conical portion of the rotor body offset in the direction of rotation of the rotor to produce forwardly inclined arrangement of said vanes with respect to the axis of the rotor, said vanes extending outwardly for a distance substantially equal to the width of said matter-discharging opening less predetermined clearance.

6. In a garbage grinding apparatus, a hollow vertically extending stationary casing, a rotor operatively mounted in the lower portion of said casing, said rotor including a body having a conically shaped upper portion and a cylindrically shaped lower portion, with said cylindrical portion of the rotor and said casing forming a matter-discharging opening, a plurality of cutting blades secured to the upper portion of said rotor body, a plurality of cutting blades secured to said casing on the inside thereof to cooperate with the blades on said rotor to cut the matter fed into said casing, and a plurality of vanes on said cylindrical portion of the rotor to form between them a plurality of matter-discharging passages, with said vanes having their ends closer to the conical portion of the rotor body offset in the direction of rotation of the rotor to produce forwardly inclined arrangement of said vanes with respect to the axis of the rotor, the angle of inclination of said vanes with respect to the axis of the rotor varying along the length of the vanes to provide for gradual increase in axial velocity of the matter driven by said vanes through said matter-discharging passages.

7. In a garbage grinding apparatus, a hollow vertically extending stationary casing, a rotor operatively mounted within said casing and having a body comprising a conically shaped upper portion and a cylindrically shaped lower portion coaxial with said upper portion, a smooth cylindrical surface formed on the lower portion of said casing to receive the cylindrical portion of said rotor and to form an annular grading matter-discharging opening therebetween, a plurality of straight blades made as separate pieces and mounted on said rotor, a plurality of straight vertical blades adjustably mounted on said casing and adapted, when the rotor is rotated, to meet in cutting engagement with said rotor blades along lines lying within a cylindrical plane, the cylindrical portion of said rotor being provided with a plurality of recesses directed downwardly and at an angle to the axis of the rotor, said recesses having their lower ends pointing in the direction of rotation of the rotor and terminating before reaching the outlet of said discharge opening.

8. In a garbage grinding apparatus, a hollow vertically extending stationary casing, a rotor operatively mounted within said casing and having a body comprising a conically shaped upper portion and a cylindrically shaped lower portion coaxial with said upper portion, a smooth cylindrical surface formed on the lower portion of said casing to receive the cylindrical portion of said rotor and to form therewith an annular grading matter-discharging opening, a plurality of straight blades made as separate pieces and mounted on said rotor, a plurality of straight vertical blades adjustably mounted on said casing and adapted, when the rotor is rotated, to meet in cutting engagement with said rotor blades along lines lying within a cylindrical plane, and a plurality of raised elements provided on the cylindrical portion of said rotor to form pumping vanes and passages therebetween for the cut matter, and at least one shelf vane provided on the conical portion of said rotor and in such relation to the direction of rotation of the rotor as to throw pieces of the matter to be cut upwardly.

References Cited in the file of this patent

UNITED STATES PATENTS

| | | |
|---|---|---|
| 759,643 | Sturtevant | May 10, 1904 |
| 1,174,656 | Beckwith | Mar. 7, 1916 |
| 1,987,941 | Mathews | Jan. 15, 1935 |
| 2,004,737 | Tonks | June 11, 1935 |
| 2,579,400 | Schindler | Dec. 18, 1951 |

FOREIGN PATENTS

| | | |
|---|---|---|
| 304,233 | Great Britain | Mar. 20, 1930 |
| 398,121 | Great Britain | Sept. 7, 1933 |